USOO7126525B2

(12) United States Patent (10) Patent No.: US 7,126,525 B2
Suzuki et al. (45) Date of Patent: *Oct. 24, 2006

(54) MILLIMETER WAVE-RADAR AND METHOD FOR MANUFACTURING THE SAME

(75) Inventors: Mitsushige Suzuki, Hitachinaka (JP); Kazuaki Takano, Mito (JP)

(73) Assignees: Hitachi, Ltd., Tokyo (JP); Hitachi Car Engineering Co., Ltd., Ibaraki-ken (JP)

(*) Notice: Subject to any disclaimer, the term of this patent is extended or adjusted under 35 U.S.C. 154(b) by 0 days.

This patent is subject to a terminal disclaimer.

(21) Appl. No.: 10/784,882

(22) Filed: Feb. 24, 2004

(65) Prior Publication Data

US 2004/0227663 A1    Nov. 18, 2004

(30) Foreign Application Priority Data

Mar. 24, 2003  (JP)  ............................. 2003-079314
Jan. 28, 2004  (JP)  ............................. 2004-019143

(51) Int. Cl.
*G01S 13/93*    (2006.01)
(52) U.S. Cl. .................. 342/70; 342/1; 342/4; 342/175
(58) Field of Classification Search ................ 342/1–4, 342/70–74, 175
See application file for complete search history.

(56) References Cited

U.S. PATENT DOCUMENTS 5,275,880 A * 1/1994 Boyer et al. ................ 428/328

6,111,551 A      8/2000   Schmidt et al.
6,496,138 B1    12/2002   Honma
2001/0040524 A1 11/2001   Suzuki et al.

FOREIGN PATENT DOCUMENTS

| EP | 1118872     | 7/2001 |
| EP | 1398647     | 3/2004 |
| JP | 10126146    | 5/1998 |
| JP | A-10-125146 | 5/1998 |
| JP | 2001127523  | 5/2001 |

OTHER PUBLICATIONS

U.S. Appl. No. 10/390,596, filed Mar. 19, 2003, Hitachi, Ltd.

* cited by examiner

*Primary Examiner*—Thomas H. Tarcza
*Assistant Examiner*—Isam Alsomiri
(74) *Attorney, Agent, or Firm*—Crowell & Moring LLP (57) ABSTRACT

A millimeter-wave radar has a radome or radar cover including a layer, the dielectric constant of which is a greater than that of the other portion without the layer, or including a magnetic loss layer in an appropriate position with respect to the antenna. The dielectric constant of the radome or radar cover can be made higher in a portion corresponding to the side of the antenna than in a portion corresponding to the front of the antenna.

16 Claims, 9 Drawing Sheets

DETAIL OF B

DETAIL OF C

MILLIMETER WAVE-RADAR AND METHOD FOR MANUFACTURING THE SAME

BACKGROUND OF THE INVENTION

The present invention relates to a millimeter wave-radar mounted on automobiles and a method of manufacturing the same.

A millimeter wave-radar for automatic guidance and collision avoidance of a vehicle radiates an electromagnetic wave of a millimeter band in a desired direction and receives a reflected wave from objects in front of the radar to detect possible obstacles.

Conventional millimeter wave-radars have a problem that sidelobes of radiated electromagnetic waves are reflected by objects surrounding a radar fixing portion, resulting in unwanted objects also being detected in addition to targeted objects. A conventional countermeasure to deal with this problem involves installing a metal plate or electromagnetic wave absorber on a plane of and around the transmission/reception antenna in an antenna unit so that it protrudes from the antenna surface, in order to reduce sidelobes, as shown in, for example, JP-A-10-126146.

In the conventional technique described above, however, since the metal plate or radio wave absorber mounted around the transmission/reception antennas are separated from a radome enclosing the antennas, the construction and manufacturing process of the radar itself are complex and the metal plate or radio wave absorber is required to have a sufficient strength. This increases the thickness and weight of the absorber itself.

Another problem is that the metal plate or radio wave absorber is often installed, along with a car-mounted radar, on such locations as will be exposed to wind and rain and thus are required to have an improved weatherability.

An object of this invention is to provide a millimeter-wave radar which is light in weight with an excellent weatherability, prevents unwanted reflection of sidelobes and has an excellent detection performance.

SUMMARY OF THE INVENTION

The above problem is solved by a millimeter-wave radar which comprises: an antenna base having a transmission/reception antenna; a housing fixing the antenna base; and at least a radome or a radar cover enclosing the antenna base; wherein the radome or the radar cover is provided with a radio wave absorbing layer.

In a millimeter-wave radar comprising an antenna base having a transmission/reception antenna, a housing fixing the antenna base, and a radome enclosing the antenna base or a radar cover enclosing the radome, it is preferred that a radio wave absorbing layer, whose performance is adjusted according to its position with respect to the transmission/reception antenna, be integrally formed in an inner surface, inner layer or outer surface of the radome and the radar cover through an insert molding or double molding process as a layer having a predetermined angle to a surface of the transmission/reception antenna or as a composite structure made up of the layer having the predetermined angle and a layer having a predetermined angle to a normal of the surface of the transmission/reception antenna.

With this construction, a mutual engagement between the radio wave absorbing layer that blocks the transmission of radio waves and the material of the radome or the radar cover is facilitated. This construction also allows the performance of the radio wave absorbing layer to be adjusted according to its position with respect to the surface of the transmission/reception antenna. As a result, the layer can offer a maximum performance for radio wave absorption with a minimum required thickness of layer, thereby preventing sidelobes of radiated electromagnetic waves from being reflected by objects surrounding a radar fixing portion.

The radio wave absorbing layer is a layer with a greater dielectric loss than that of the material of the radome or radar cover, or a magnetic loss layer. Among preferred materials with a high dielectric loss are carbon materials (carbon nanotube, carbon microcoil, shungite carbon, carbon black, expanded graphite, carbon fiber, etc.). Examples of preferred magnetic loss layer include hexagonal ferrite and metals. It is also preferred that the radio wave absorbing layer be formed into a mesh of less than ¼ of wavelength so that its own weight can be reduced while maintaining the performance for radio wave absorption.

It is preferred that the dielectric constant of the main materials for the radome and the radar cover, which affects the radio wave transmission characteristic, be adjusted in such a manner that the dielectric constant of a portion of the radome and the radar cover corresponding to the side of the transmission/reception antenna is greater than that of a portion corresponding to the front of the antenna. For example, a part of the radome and the radar cover which corresponds to the front of the antenna may use a material that can pass radio waves without any loss (dielectric constant of 3.0 or less; polycarbonate, syndiotactic polystyrene, polypropylene and a combination of these materials as a main ingredient and acrylonitrile butadiene styrene (ABS)). A part of the radome and the radar cover which corresponds to the side of the antenna may have a compounding ratio of glass fibers changed to increase the radio wave loss (to achieve a dielectric constant in excess of 3.0) or use a material with a greater dielectric constant, such as PBT, than that of a portion corresponding to the front of the antenna and have it integrally formed therewith through insert molding or double molding.

This arrangement allows the radio wave transmission characteristic of the radome or radar cover to be adjusted according to its position with respect to the surface of the transmission/reception antenna. This in turn alleviates adverse effects of sidelobes of the radiated electromagnetic waves without degrading the performance for an electromagnetic wave transmission at the front of the antenna.

If one or both of the above two constructions are adopted, a millimeter-wave radar can be realized which has a light, inexpensive construction with an excellent weatherability, prevents unwanted reflection of sidelobes, and offers an excellent detection performance.

DETAILED DESCRIPTION OF THE EMBODIMENTS

An embodiment of this invention will be described with referring to the accompanying drawings.

Figure 1:
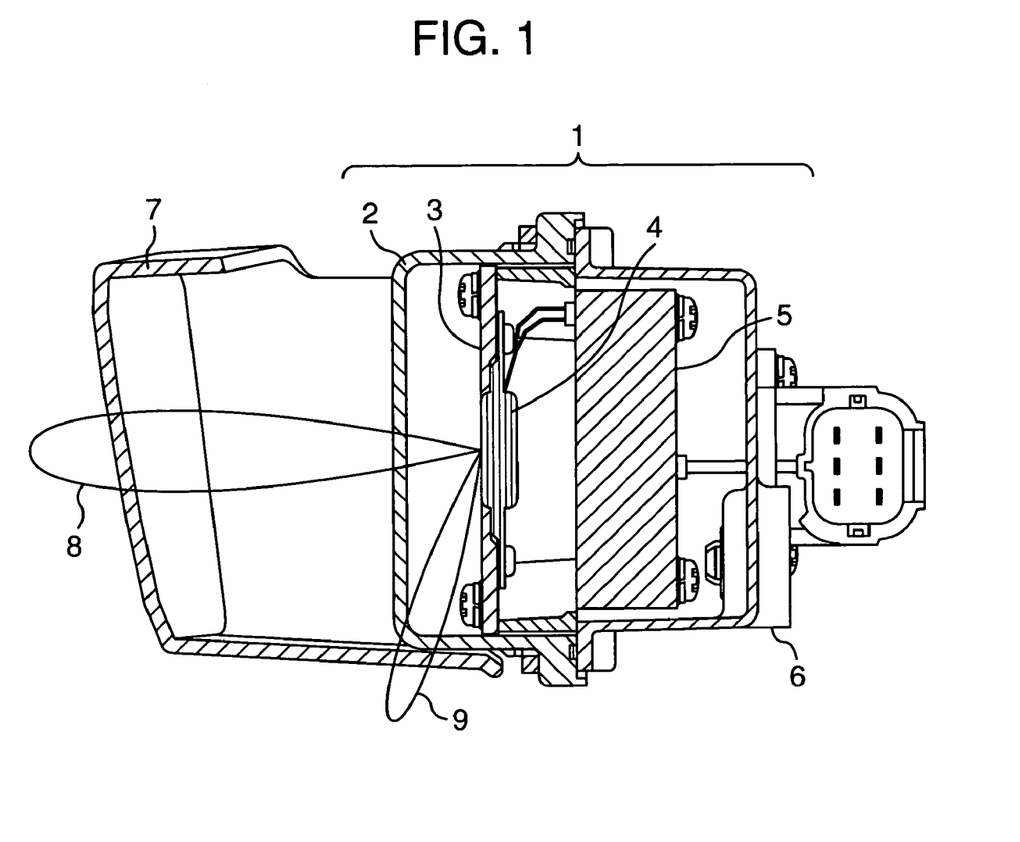
FIG. 1 is a cross-sectional view of a millimeter-wave radar showing sidelobes radiated from a transmission/reception antenna.
Figure 11:
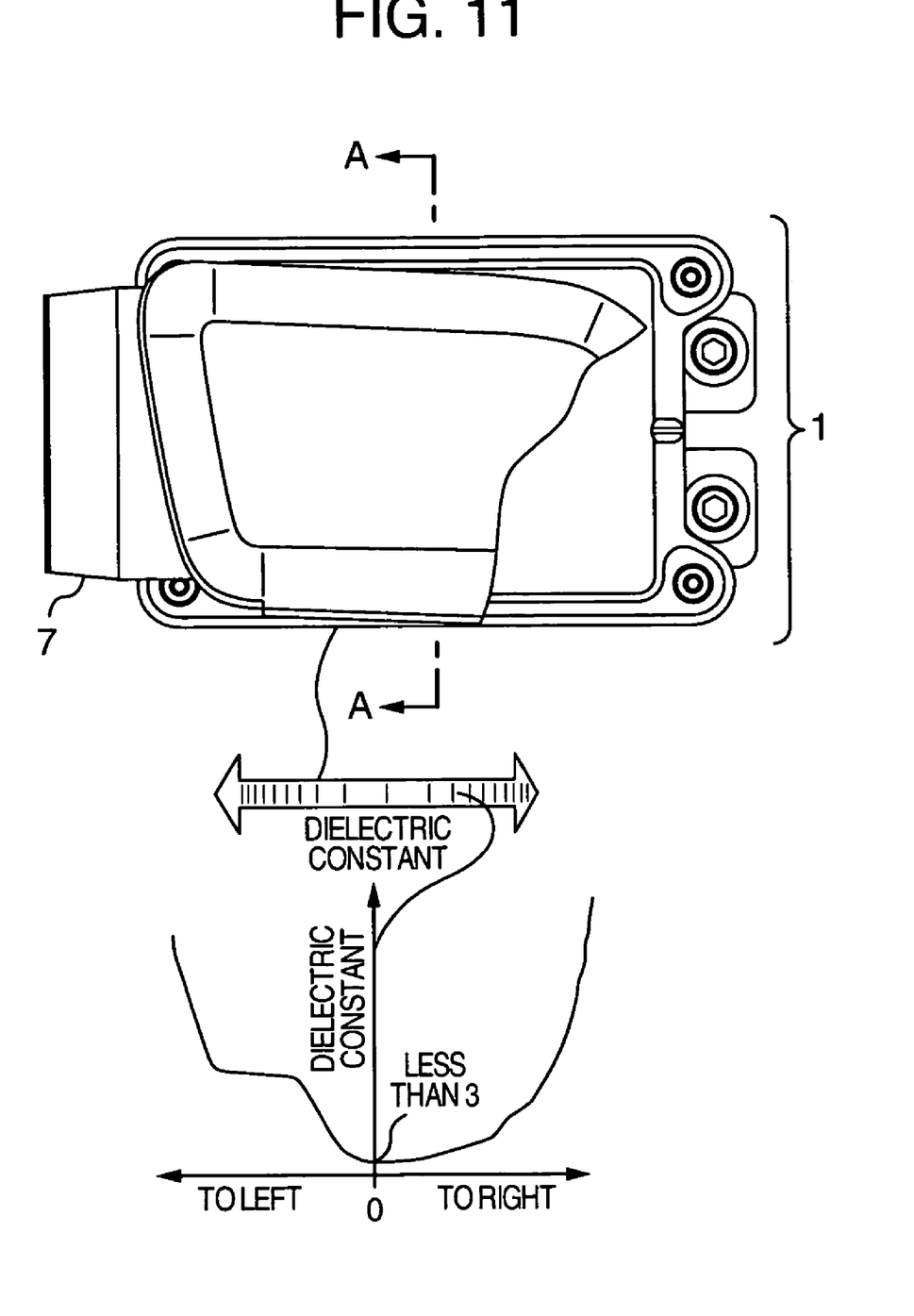
FIG. 11 is a front view of a millimeter-wave radar.

FIG. 11 shows a front view of a millimeter-wave radar and FIG. 1 is a cross-sectional view of the millimeter-wave radar taken along the line A—A of FIG. 11. The millimeter-wave radar of FIG. 1 comprises a radome 2, an antenna base 3 incorporating transmission and reception antennas, a control circuit 5, an RF module 4, and a housing 6 fixing the antenna base 3 and accommodating the control circuit 5 and the RF module 4. In front of the antenna base 3 is mounted the radome 2 that covers the entire surface of the antenna base and protects it against bouncing pebbles and rain. Depending on circumstances a radar cover 7 may be installed in front of the radome 2 to enclose it. Further, only the radar cover 7 may be used without the radome 2. It is also possible to use a windshield of the car as a radar cover.

Reference numbers 8 and 9 in FIG. 1 conceptually represent a main beam and a sidelobe, respectively, of the radiated radio wave from the transmission antenna.

The transmission/reception antenna in this specification means an antenna arrangement that enables radio wave transmission and reception. If a transmission antenna and a reception antenna are separated, this arrangement is included in the transmission/reception antenna of this specification.

In FIG. 1 the radome 2 or radar cover 7 must transmit a radio wave without reflecting or absorbing it. So, a material for these components preferably has a dielectric constant of 3.0 or less in a frequency range of the millimeter wave used. The material also needs to have good chemical resistance, mechanical strength and machinability and low cost.

TABLE 1

Table 1 Dielectric constants of various materials (for 76.5 GHz)

| Material | Dielectric constant |
|---|---|
| Polycarbonate (PC) | 3.0 |
| Syndiotactic polystyrene (SPS) | 2.6 |
| Polypropylene (PP) | 2.2 |
| ABS resin | 2.7 |

Generally, a car-mounted millimeter wave-radar is installed on a portion exposed to open air (for example, in front of a radiator or on the back of a bumper). As shown in FIG. 1, sidelobes 9 of the radio wave radiated from the transmission antenna pass through sides of the radome (including cases where sidelobes pass through only the side surfaces of the radome, through only the top and bottom surfaces, through only a part of the side surfaces and of the top and bottom surfaces, and through both side surfaces and the top and bottom surfaces) and are reflected by members making up the vehicle body or those outside the vehicle. These reflected waves may reenter into the radome to be received by a reception antenna which may detect unnecessary objects in addition to the targeted objects.

Figure 2:
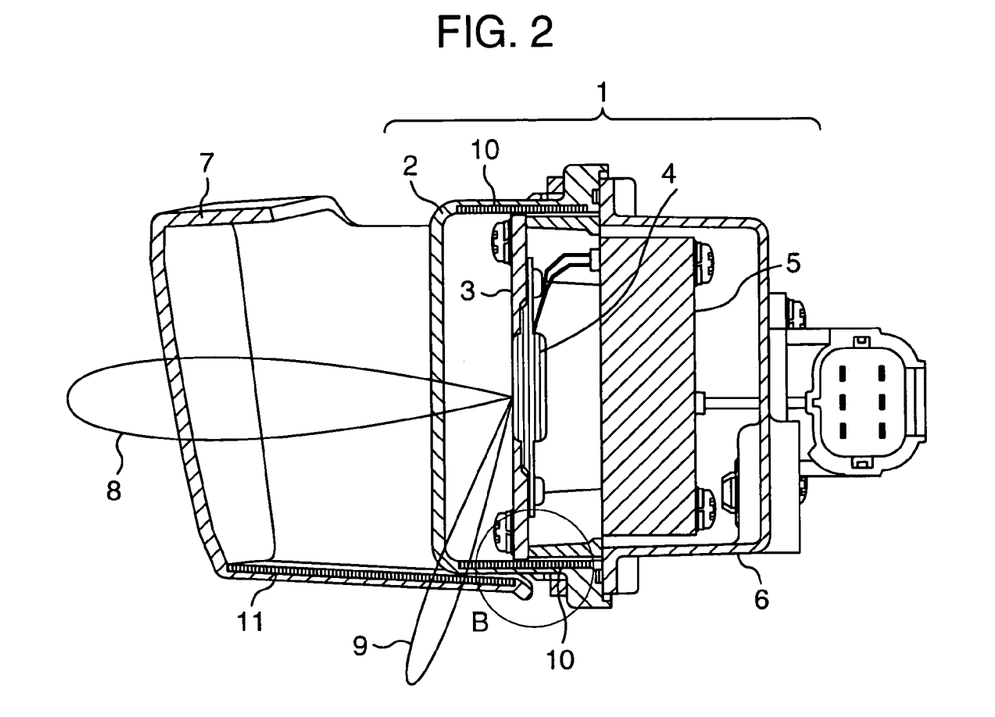
FIG. 2 is a cross-sectional view of a millimeter-wave radar according to one embodiment of this invention.
Figure 3:
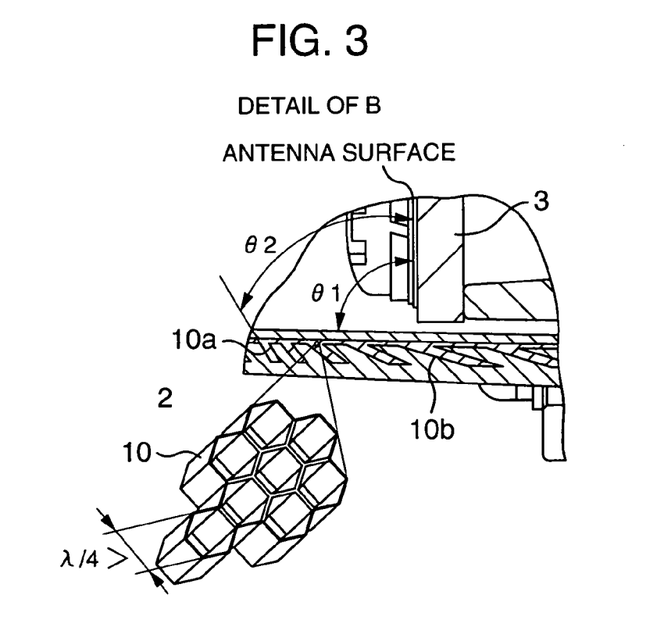
FIG. 3 is a detailed cross-sectional view of FIG. 2.

FIG. 2 is a cross-sectional view of a millimeter-wave radar of this embodiment and FIG. 3 is an enlarged cross-sectional view of the radome.

In the millimeter-wave radar of FIG. 2, layers with a larger dielectric loss than that of the radome 2 or magnetic loss layers are installed on a part of the side surfaces of the radome 2 (including inner surfaces, inner layers or outer surfaces thereof) in the form of radio wave absorbing layers 10, with their surfaces arranged in an optimum relation to the antenna surface, to absorb sidelobes radiated from the transmission antenna thereby reducing unwanted transmission of sidelobes.

More specifically, the radio wave absorbing layers 10 are arranged as shown in FIG. 3 by insert-molding or double-molding only a layer tilted at a predetermined angle of θ1 to the surface of the transmission/reception antenna or a composite structure made up of the layer tilted at the angle θ1 and a plurality of layers tilted at an angle θ2 toward the normal of the antenna base 3.

This construction allows the sidelobe absorbing material to have only the required thickness to absorb sidelobes without having to increase its mechanical strength. Further, since the performance of the sidelobe absorbing material can be adjusted according to its relative position to the surface of the transmission/reception antenna, the problem of an increased weight can be avoided.

Further, in the millimeter-wave radar of this embodiment, since the sidelobe absorbing material is provided in a part of the radome, it is possible not only to absorb the sidelobes without complicating the construction or manufacturing process of the antenna unit (antenna and its associated members) but also to protect the antenna surface from wind and rain.

Further, since the sidelobe absorbing material (radio wave absorbing layers) is formed integral with the radome, a mutual arrangement of the sidelobe absorbing material and the antenna base can be done easily.

The radio wave absorbing layers 10 may be formed in a mesh of less than ¼ of wavelength through which radio wave cannot pass. It is also possible to provide magnetic loss layers 11 on the radar cover, as necessary, to reduce unwanted transmission of reflected wave from surroundings of the radar fixing portion or from road surfaces.

Examples of the layer with a greater dielectric loss than that of the radome include carbon materials (carbon nanotubes, carbon microcoils, shungite carbons, carbon blacks, expanded graphites, carbon fibers, etc.). The magnetic loss layer may preferably use a hexagonal ferrite (an M-type hexagonal ferrite with a part of Fe replaced with Ti, Mn, Al or the like, such as $BaFe_{12}O_{19}$ and $SrFe_{12}O_{19}$).

With these arrangements, a millimeter wave-radar can be realized which is lightweight and inexpensive, has an excellent weatherability, prevents unwanted reflection of sidelobes and has an excellent detection performance.

Figure 4:
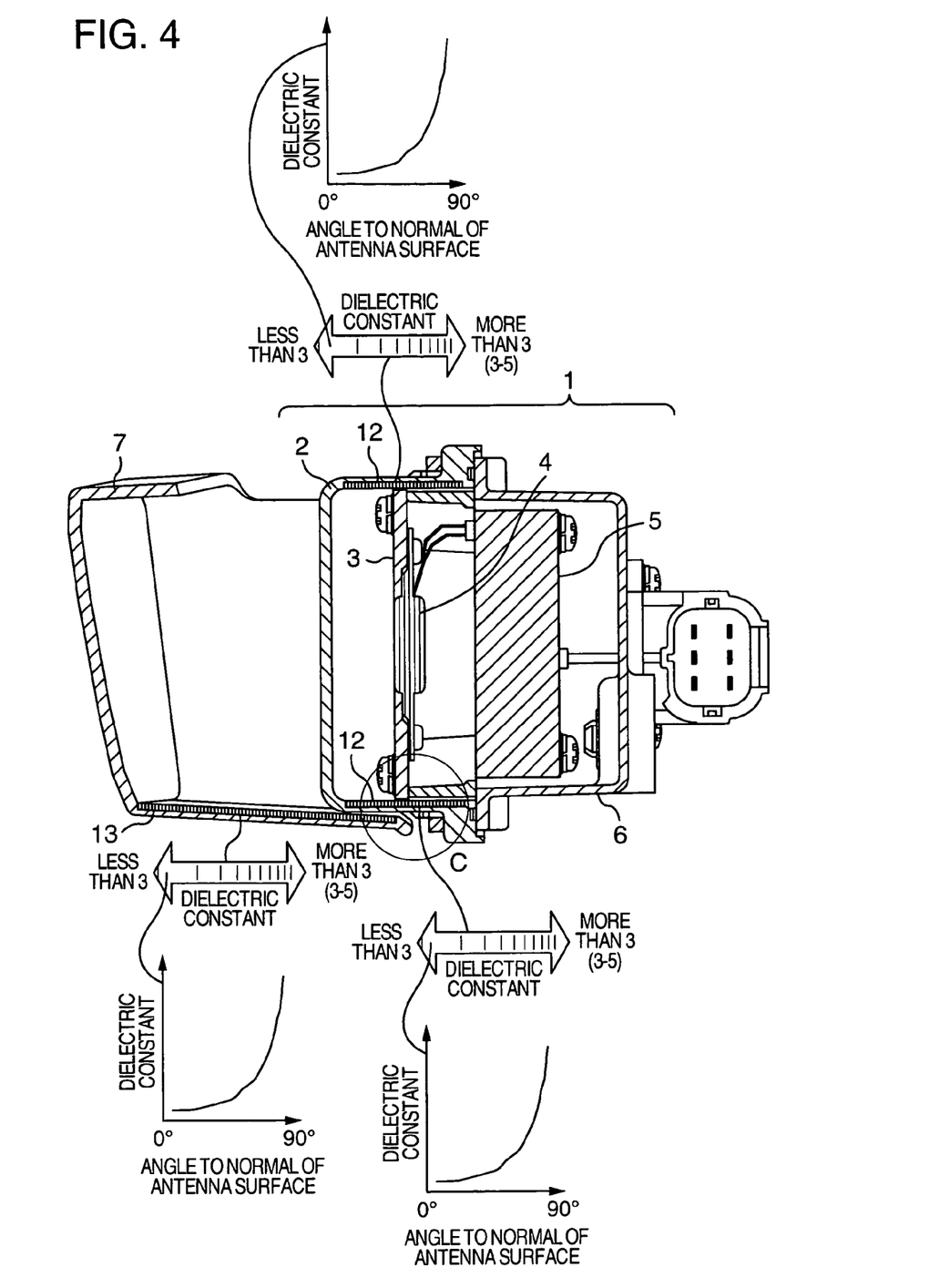
FIG. 4 is a cross-sectional view of a millimeter-wave radar according to another embodiment of this invention.
Figure 5:
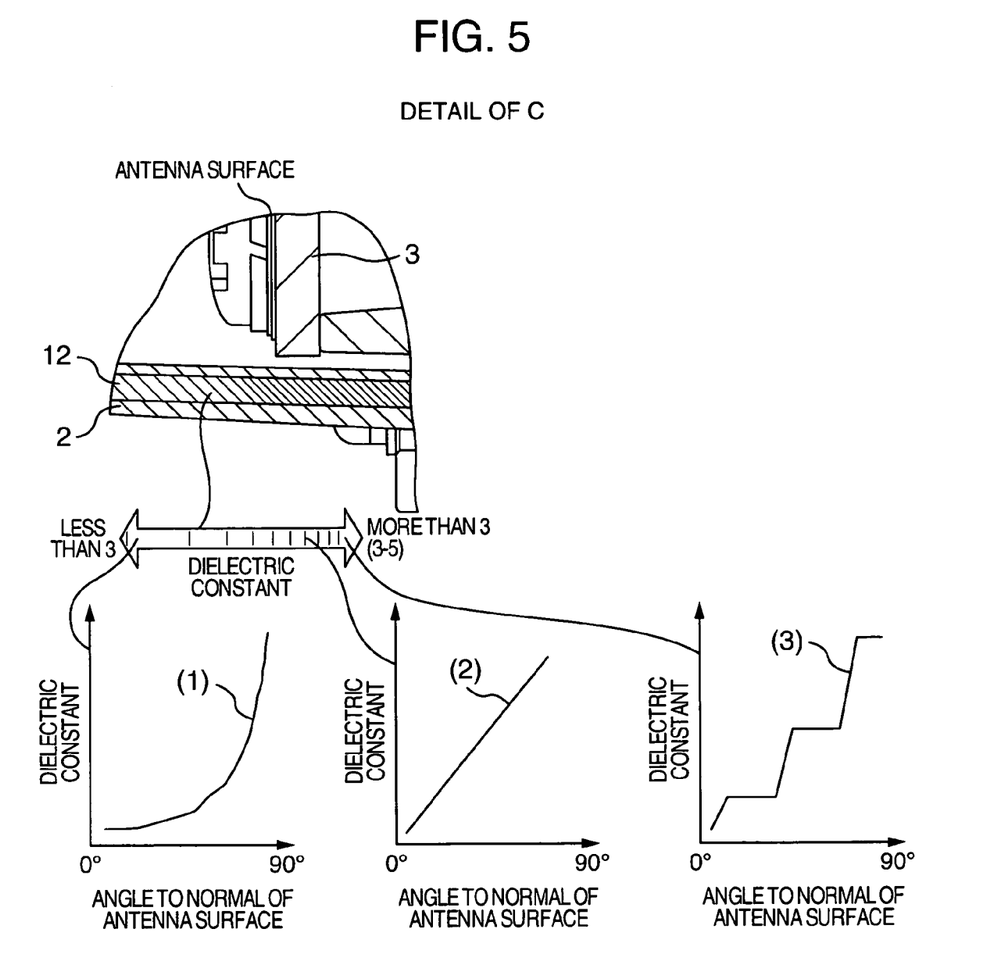
FIG. 5 is a detailed cross-sectional view of FIG. 4.

Another embodiment of a millimeter wave-radar is shown in FIG. 4. In FIG. 14, numeral 12 shows a layer with a dielectric constant than that of a portion of radome 2 which corresponds to the front of the transmission/reception antenna, and numeral 13 indicates a layer with a greater dielectric constant than that of a portion of radar cover 7 which corresponds to the front of the antenna. FIG. 5 shows an expanded cross-sectional view of a radome. A portion of the radome 2 or radar cover 7 corresponding to the front of the transmission/reception antenna needs to pass radio waves without reflecting or absorbing them. A portion of the radome corresponding to the side of the transmission/reception antenna preferably has a larger dielectric constant (3.0 or higher) to prevent transmission of radio waves.

Thus, as shown in FIG. 4, at a certain position in the layer 12 of the radome 2 where a line connecting the position and a center of the antenna surface forms 90 degrees with a normal of the antenna surface (i.e., at a position near the side of the antenna) the dielectric constant is set to more than 3.0, with the dielectric constant of the radome decreasing as the angle to the normal of the antenna surface decreases (i.e., as the position on the radome moves away from the side of the antenna toward the front). This arrangement realizes a radome 2 or radar cover 7 which passes radio waves in front of the antenna but blocks them at the side of the antenna.

For the radome 2 or radar cover 7 to have a greater dielectric constant in portions corresponding to the side of the transmission/reception antenna than in portions corresponding to the front of the antenna, a compounding ratio of glass fibers contained in a material of the radome may be increased progressively toward the side of the antenna, as shown in FIG. 5, or a material with a large dielectric constant of more than 3.0, such as PBT (polybutylene terephthalate), may be insert-molded or double-molded in the radome. It is also possible to insert-mold or double-mold a meshlike carbon material or hexagonal ferrite with the radome, the size of the mesh being less than ¼ of wavelength at which radio waves cannot pass through.

A rate of increase of the dielectric constant with respect to the angle to the normal of antenna surface may be set to a quadratic curve characteristic of (1) of FIG. 1, a straight line characteristic (2) of FIG. 5 or a stepwise characteristic (3) of FIG. 5, or a combination of these. While this embodiment has taken up an example case in which the dielectric constant is changed according to the angle to the normal of antenna surface, it is also possible to change the dielectric constant in a horizontal lateral direction or vertical direction of the radar cover 7 or radome 2, as shown in FIG. 11. FIG. 11 represents a case where it is desired from the mounting position of the radar that the radio waves not be radiated toward the left on the drawing. Normally, the dielectric constant characteristic may be set laterally symmetric.

Figure 6:
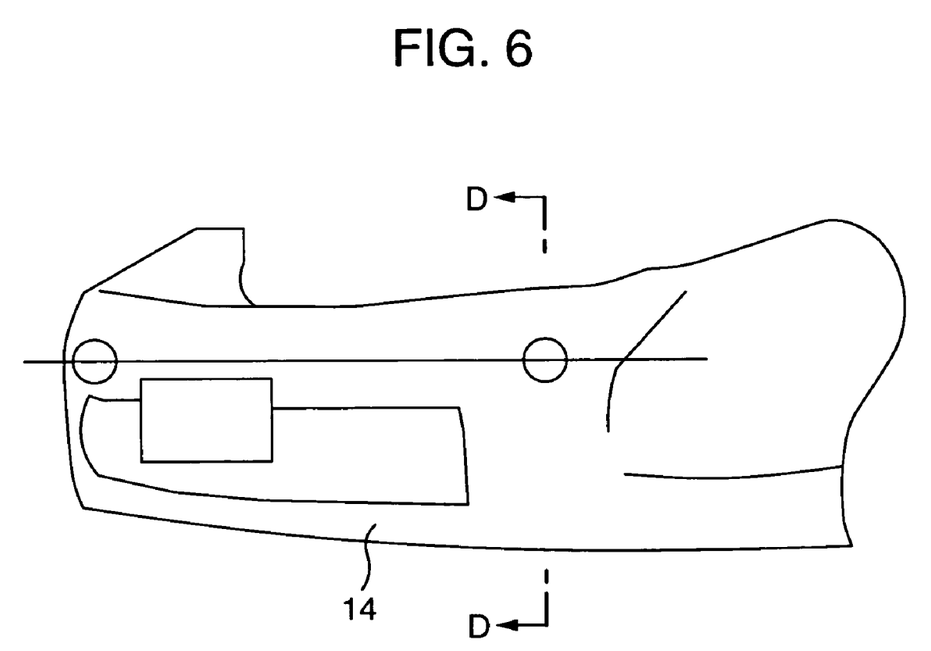
FIG. 6 illustrates an automotive bumper serving also as a radar cover.
Figure 7A:
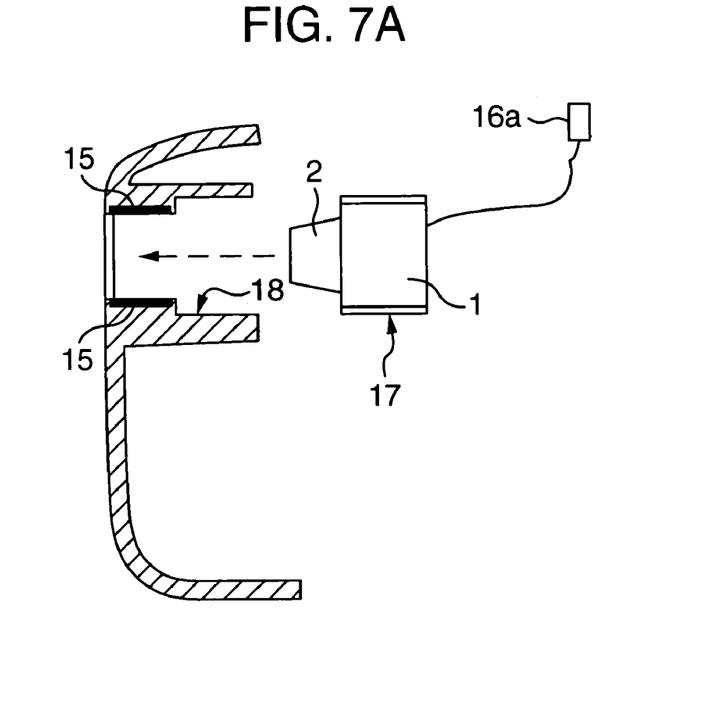
FIGS. 7A, 7B and 7C are detailed cross-sectional views of FIG. 6.
Figure 7B:
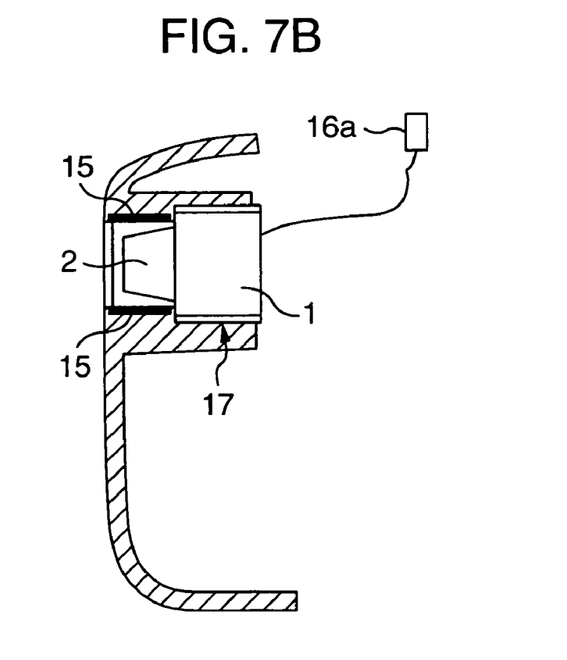
Figure 7C:
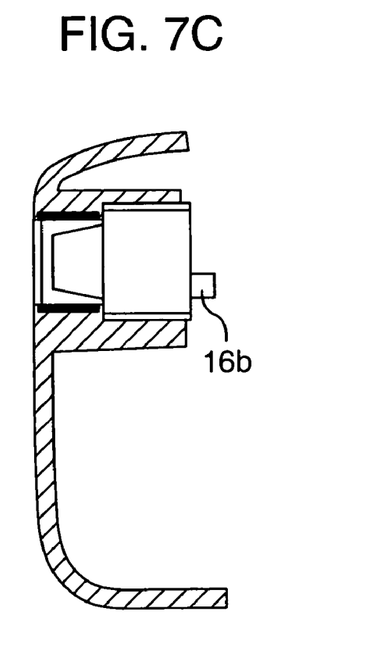

FIG. 6 shows an embodiment in which a bumper 14 is used as the radar cover. FIGS. 7A–7C are cross sectional views of the bumper. As shown in FIG. 7A, the bumper 14 has a recessed portion 18 in its inner wall in which a millimeter-wave radar 1 is mounted from inside the bumper 14. The millimeter-wave radar 1 may be screwed to, press-fitted to or bonded to the bumper 14. It may also be fixed by screws after insertion into the recessed portion 18. When the radar is fixed, a radar axis is adjusted at the same time.

The inner wall of the bumper 14 is fitted with a radio wave attenuation layer or radio wave absorbing layer 15 whose dielectric constant is large at a portion near the side of the antenna surface of the millimeter-wave radar 1 (dielectric constant: more than 3.0) and decreases as a point of interest on the layer moves away from the antenna surface (dielectric constant: less than 3.0).

More specifically, this may be achieved by progressively increasing a compounding ratio of glass fibers or the like in such a manner that the dielectric constant of a portion of the layer corresponding to the side of the antenna is larger than that of a portion of the layer corresponding to the front of the antenna. Another method involves insert-molding or double-molding a material having a dielectric constant of more than 3.0 or integrally forming a meshlike carbon material and hexagonal ferrite in the bumper inner wall through insert molding or double molding, the mesh size being less than ¼ of wavelength at which the radio wave cannot pass through. The connection between the millimeter wave-radar 1 and the vehicle is accomplished through a connector 16a at an end of a harness led out from the radar body as shown in FIGS. 7A and 7B or through a connector 16b provided on the millimeter wave-radar 1 as shown in FIG. 7C.

Next, an example method of manufacturing a radome 2 such as shown in FIG. 2 or FIG. 4 will be described with referring to FIGS. 8A–8C to FIG. 10.

Figure 8A:
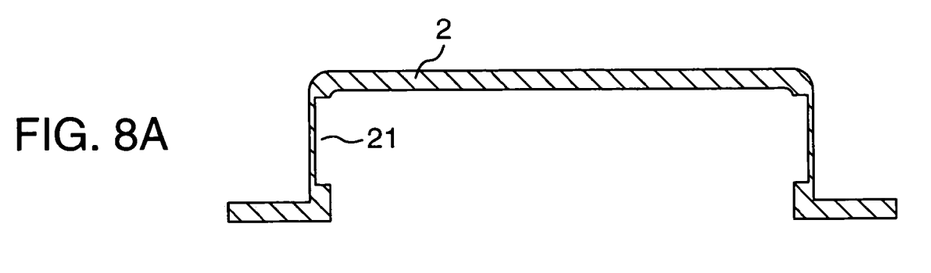
FIGS. 8A, 8B and 8C are schematic cross-sectional views showing a process of manufacturing a radome.
Figure 8B:
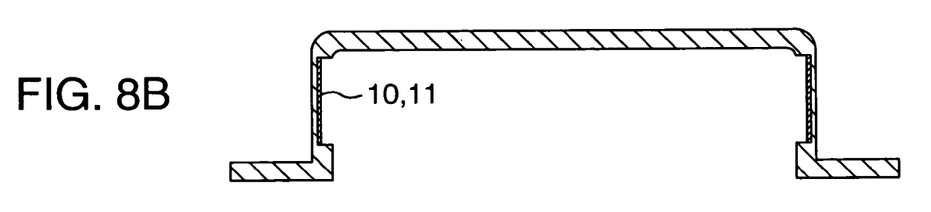
Figure 8C:
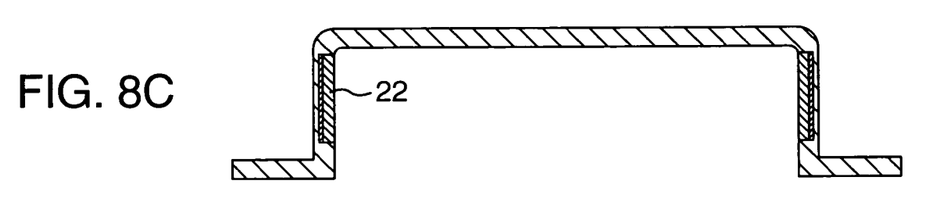

FIGS. 8A–8C show one example method of manufacturing the radome 2. First, as shown in FIG. 8A, the radome 2 is formed by a generally available method such as injection molding. The radome 2 is formed with a recessed portion 21 at a position where the radio wave attenuation layer or radio wave absorbing layer is to be arranged.

Next, as shown in FIG. 8B, the radio wave attenuation layer or radio wave absorbing layer 10, 11 is formed in the recessed portion 21 of the radome 2 by arranging glass fibers or PBT (polybutylene terephthalate) with a dielectric constant of more than 3.0, or by forming a carbon material of a greater dielectric loss than the radome 2 or a hexagonal ferrite into a mesh of ¼ of wavelength at which the radio waves cannot pass through.

The radio wave attenuation layer or radio wave absorbing layer 10, 11 may also be formed by inserting or pasting the above-mentioned material prepared separately into the recessed portion 21 or through injection molding. The only requirement during this process is to set the dielectric constant higher in a portion of the radome corresponding to the side of the antenna than in a portion corresponding to the front of the antenna, as shown in FIG. 4 or FIG. 5.

The radio wave attenuation layer may be formed by using a material with a dielectric constant of more than 3.0 or a combination of this material and a radome 2 material. A method of changing the dielectric constant may involve increasing the thickness of the layer toward the side of the antenna or increasing a compounding ratio of glass fibers or a material with a dielectric constant of more than 3.0.

As shown in FIG. 8C, an opening of the recessed portion 21, in which the radio wave attenuation layer or radio wave absorbing layer 10, 11 is installed, is closed. This may be accomplished by inserting and bonding a separate member 22 or by filling the recessed portion 21 with the same material as the radome 2 to enclose the radio wave attenuation layer or radio wave absorbing layer 10, 11.

It is noted that, even in the construction in which the radio wave attenuation layer or radio wave absorbing layer 10, 11 is exposed on the inner side of the radome, as shown in FIG. 8B, the desired effect of this invention can be produced. But since the interior of the radome 2 is a space into which outer air enters and is subjected to humidity and temperature changes, it is preferred as shown in FIG. 8C that the radio wave attenuation layer or radio wave absorbing layer 10, 11 not be exposed, in order to minimize degradation of the layers and their characteristics.

Figure 9A:
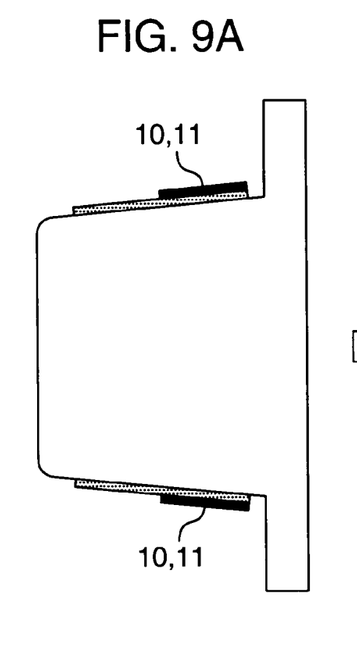
FIGS. 9A and 9B are schematic cross-sectional views showing a process of manufacturing a radome.
Figure 9B:
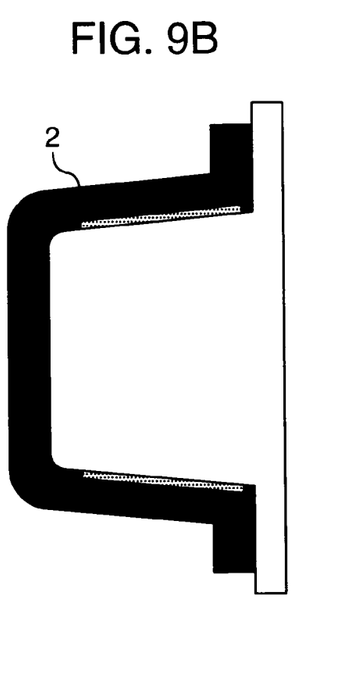

In the embodiment shown in FIGS. 8A–8C, we have described the radome fabrication method which, after the entire radome 2 has been formed, double-molds it with a material having a dielectric constant of more than 3.0 to form the radio wave attenuation layer or radio wave absorbing layer. We have also described another radome fabrication method which pastes a separately formed radio wave attenuation layer or radio wave absorbing layer to the inner surface of the radome. It is also possible, as shown in FIGS. 9A and 9B, to prepare a mold 102 that defines a shape of the inner wall of the radome 2 and arrange glass fibers or a material with a dielectric constant of more than 3.0 on the mold 102 for molding the entire radome 2. Alternatively, the material placed on the mold may be a carbon material with a greater dielectric loss than the radome 2 or hexagonal ferrite, both formed into a mesh of ¼ of wavelength at which radio waves cannot pass through.

Figure 10A:
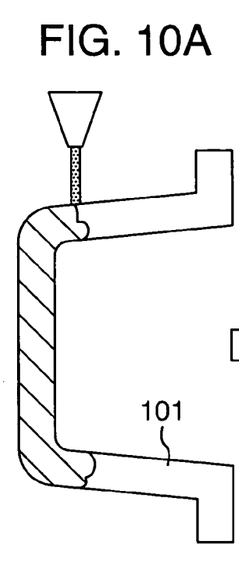
FIGS. 10A, 10B and 10C are schematic cross-sectional views showing a process of manufacturing a radome.
Figure 10B:
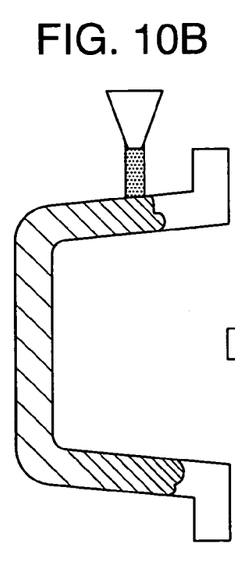
Figure 10C:
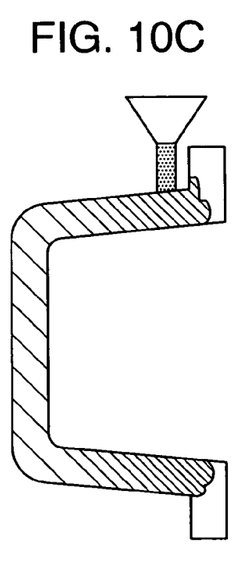

FIGS. 10A–10C show an example case in which the radome 2 is fabricated by injection molding. First, as shown in FIG. 10A, a material that passes radio waves radiated from the millimeter wave-radar 1 is injected into a mold 101 to form a front part of the radome 2.

Next, as shown in FIGS. 10B and 10C, a side portion of the radome 2 is formed by either switching the material being injected to glass fibers or a material with a dielectric constant of more than 3.0, such as PBT (polybutylene terephthalate), or mixing these materials in the same material as the front part of the radome 2 and injecting them, thus locally changing the electromagnetic characteristic of the radome 2 to provide the side portion of the radome with a radio wave attenuation characteristic.

To make the dielectric constant higher in the side portion of the radome than in the portion corresponding to the front of the transmission/reception antenna, as shown in FIG. 4, the side portion of the radome needs to be formed by increasing a compounding ratio of glass fibers or a material with a dielectric constant of higher than 3.0, such as PBT, from the front portion toward the side portion of the radome (in FIGS. 10A–10C, from left to right). Further, various characteristics shown in FIG. 5 can be realized by changing, according to the location in the radome 2, the amount being mixed or used of the glass fibers or the material having a dielectric constant in excess of 3.0.

This arrangement makes it more difficult for the radio waves to pass through the radome as the area of interest in the radome approaches the side of the transmission/reception antenna, thus alleviating adverse effects of the sidelobes. Since the radome or radar cover is a one-piece molded component, the mutual adjustment between the radome and the antenna base is made easy.

The radome adopting one or more of the above embodiments is combined with the housing 6, which accommodates the separately manufactured antenna base 3 and the control circuit 5, and they are fixed together as by screws, thus completing a millimeter-wave radar. With this arrangement, a millimeter-wave radar can be realized which has a light, inexpensive construction with an excellent weatherability, allows easy positioning of the radio wave absorbing layers with respect to the antenna base without complicating the structure or manufacturing process of the antenna base, prevents unwanted reflection of sidelobes, and offers an excellent detection performance.

This invention can provide a millimeter wave-radar which has a light, inexpensive construction with an excellent weatherability, prevents unwanted reflection of sidelobes, and offers an excellent detection performance.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A millimeter wave-radar comprising:
   an antenna base having a transmission/reception antenna;
   a housing fixing the antenna base; and
   at least a radome or a radar cover enclosing the antenna base;
   wherein the radome or the radar cover has a dielectric constant which progressively increases from a front of the transmission/reception antenna toward a side of the antenna.

2. A millimeter wave-radar according to claim 1 wherein a radio wave absorbing layer is provided to a side surface of the radome or the radar cover.

3. A millimeter wave-radar according to claim 1 wherein the radome or the radar cover is provided with a radio wave absorbing layer having its performance adjusted according to its position with respect to the transmission/reception antenna.

4. A millimeter wave-radar according to claim 1 wherein the radome or the radar cover is provided with a radio wave absorbing layer having a higher dielectric loss than that of a material of the radome or the radar cover.

5. A millimeter wave-radar according to claim 1 wherein the radome or the radar cover is provided with a radio wave absorbing layer that is a magnetic loss layer.

6. A millimeter wave-radar according to claim 1 wherein the radome or the radar cover is provided with a radio wave absorbing layer having a higher dielectric constant than that of a material of the radome or the radar cover.

7. A millimeter wave-radar according to claim 1 wherein the radome and the radar cover use a material with a dielectric constant of 3.0 or lower in a portion thereof corresponding to a front of the transmission/reception antenna.

8. A millimeter wave-radar according to claim 1 wherein the radome and the radar cover use, as a main ingredient in a portion thereof corresponding to a front of the transmission/reception antenna, at least one of polycarbonate, syndiotactic polystyrene, polypropylene and a combination of these materials as a main ingredient and acrylonitrile butadiene styrene (ABS).

9. A millimeter wave-radar according to claim 1 wherein the radome or the radar cover is provided with a radio wave absorbing layer formed of only a layer having a predetermined angle to a surface of the transmission/reception antenna or of a combination of the layer having the predetermined angle and a layer having a predetermined angle to a normal of the surface of the transmission/reception antenna.

10. A millimeter wave-radar according to claim 1 wherein the radome or the radar cover is provided with a radio wave absorbing layer is a mesh of less than ¼ of wavelength.

11. A millimeter wave-radar comprising:
    an antenna base having a transmission/reception antenna;
    a housing fixing the antenna base; and
    at least a radome or a radar cover enclosing the antenna base;
    wherein the radome or the radar cover is provided with a radio wave absorbing layer formed through an insert molding process or a double molding process; and
    wherein the radome or the radar cover has a greater dielectric constant in a portion thereof corresponding to a side of the transmission/reception antenna than in a portion thereof corresponding to a front of the antenna.

12. A millimeter wave-radar according to claim 11, wherein the radome and the radar cover use in a portion thereof corresponding to a front of the transmission/reception antenna a material with a dielectric constant of 3.0 or lower.

13. A millimeter wave-radar according to claim 11, wherein the radome and the radar cover use, as a main ingredient in a portion thereof corresponding to a front of the transmission/reception antenna, at least one of polycarbonate, syndiotactic polystyrene, polypropylene and a combination of these materials as a main ingredient and ABS.

14. A millimeter wave-radar comprising:
an antenna base having a transmission/reception antenna;
a housing fixing the antenna base; and
at least a radome or a radar cover enclosing the antenna base;
wherein the radome or the radar cover has a dielectric constant which progressively increases from a front of the transmission/reception antenna toward a side of the antenna, and wherein the radome and the radar cover use in a portion thereof corresponding to a front of the transmission/reception antenna a material with a dielectric constant of 3.0 or lower.

15. A millimeter wave-radar comprising:
an antenna base having a transmission/reception antenna;
a housing fixing the antenna base; and
at least a radome or a radar cover enclosing the antenna base;
wherein the radome or the radar cover has a dielectric constant which progressively increases from a front of the transmission/reception antenna toward a side of the antenna, and wherein the radome and the radar cover use, as a main ingredient in a portion thereof corresponding to a front of the transmission/reception antenna, at least one of polycarbonate, syndiotactic polystyrene, polypropylene and a combination of these materials as a main ingredient and acrylonitrile butadiene styrene (ABS).

16. A millimeter wave-radar comprising:
an antenna base having a transmission/reception antenna;
a housing fixing the antenna base; and
at least a radome or a radar cover having an electronic permeability which progressively decreases from a front of the transmission/reception antenna toward a side of the antenna.

\* \* \* \* \*

UNITED STATES PATENT AND TRADEMARK OFFICE
CERTIFICATE OF CORRECTION

PATENT NO. : 7,126,525 B2
APPLICATION NO. : 10/784882
DATED : October 24, 2006
INVENTOR(S) : Mitsushige Suzuki and Kazuaki Takano It is certified that error appears in the above-identified patent and that said Letters Patent is hereby corrected as shown below:

On Title Page:

Item [73], Assignees: Change "Hitachi, Ltd., Tokyo (JP); Hitachi Car Engineering Co., Ltd., Ibaraki-ken (JP)" to -- Hitachi, Ltd., Tokyo, Japan --

Signed and Sealed this

Fourth Day of December, 2007

JON W. DUDAS
*Director of the United States Patent and Trademark Office*